Figure 1:
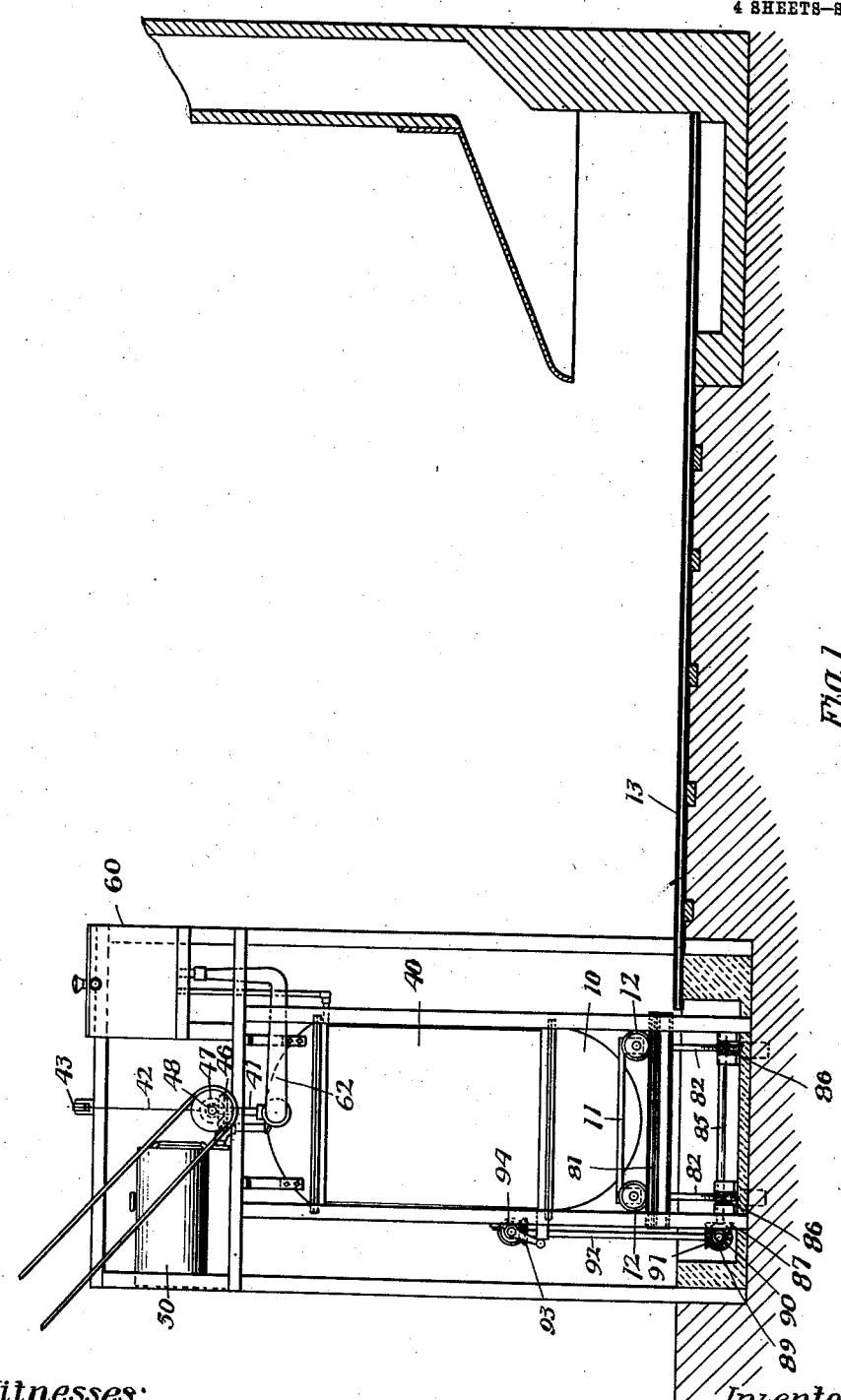

G. W. PRIEST.
APPARATUS FOR MANUFACTURING VARNISH FOR COATING LEATHER.
APPLICATION FILED AUG. 18, 1911.

1,027,563.

Patented May 28, 1912.

G. W. PRIEST.
APPARATUS FOR MANUFACTURING VARNISH FOR COATING LEATHER.
APPLICATION FILED AUG. 18, 1911.

1,027,563.

Patented May 28, 1912.

4 SHEETS—SHEET 4.

Witnesses:
H. B. Davis.
J. L. O'neill

Inventor:
George W. Priest
By Hayes & Harriman
Atty.

UNITED STATES PATENT OFFICE.

GEORGE W. PRIEST, OF NEWTON, MASSACHUSETTS.

APPARATUS FOR MANUFACTURING VARNISH FOR COATING LEATHER.

1,027,563.  Specification of Letters Patent.  Patented May 28, 1912.

Application filed August 18, 1911. Serial No. 644,807.

*To all whom it may concern:*

Be it known that I, GEORGE W. PRIEST, a citizen of the United States, residing at Newton, in the county of Middlesex and State of Massachusetts, have invented an Improvement in Apparatus for Manufacturing Varnish for Coating Leather, of which the following is a specification.

This invention relates to an apparatus for manufacturing varnish for coating leather and other objects, and is intended as an improvement upon the apparatus of Patent #971,071, dated September 27, 1910. In said patent there is provided a portable kettle adapted to be moved into and out of a furnace, a suspended dome for closing the top of the kettle beneath which the kettle is moved when out of the furnace, means for raising and lowering said dome to move it into and out of engagement with the kettle, means for delivering a liquid solvent to the contents of the kettle, a stirring-device for stirring the solvent into the contents of the kettle, a condenser connected with the dome, and means for cooling the space within the dome which is in open communication with the kettle and condenser. The means for delivering the liquid solvent and also the condenser are connected with the dome, and as said dome is movable up and down sliding connections are provided which are somewhat difficult to construct, particularly when tight joints are required.

This invention has for its object to provide means arranged beneath the dome, adapted to be operated to raise the portable kettle into engagement with the dome, so that said dome may be stationarily supported, and hence the aforesaid means connected therewith need not have sliding connections.

In said patent the stirring-device is arranged in and connected with the kettle, and an actuating-device for the stirring-device is arranged in the dome and adapted to be connected with the stirring-device by a clutch. Permanently arranging the stirring-device in the kettle is objectionable at times, particularly when emptying the kettle, and trouble frequently arises when connecting the actuating-device with the stirring-device.

Therefore, another object of the invention is to arrange the stirring-device in the dome, so that when the kettle is moved upward into engagement with the dome, said stirring-device may be lowered to enter the kettle. Such construction avoids the use of a clutch to connect the actuating-device for the stirring-device with the stirring-device, and the attendant trouble of operating said clutch at a time when the kettle is filled more or less with boiling linseed-oil, and, furthermore, leaves the kettle unobstructed in order that the contents thereof, when in the furnace may be stirred by any suitable means, and when out of the furnace may be conveniently removed.

Figure 2:
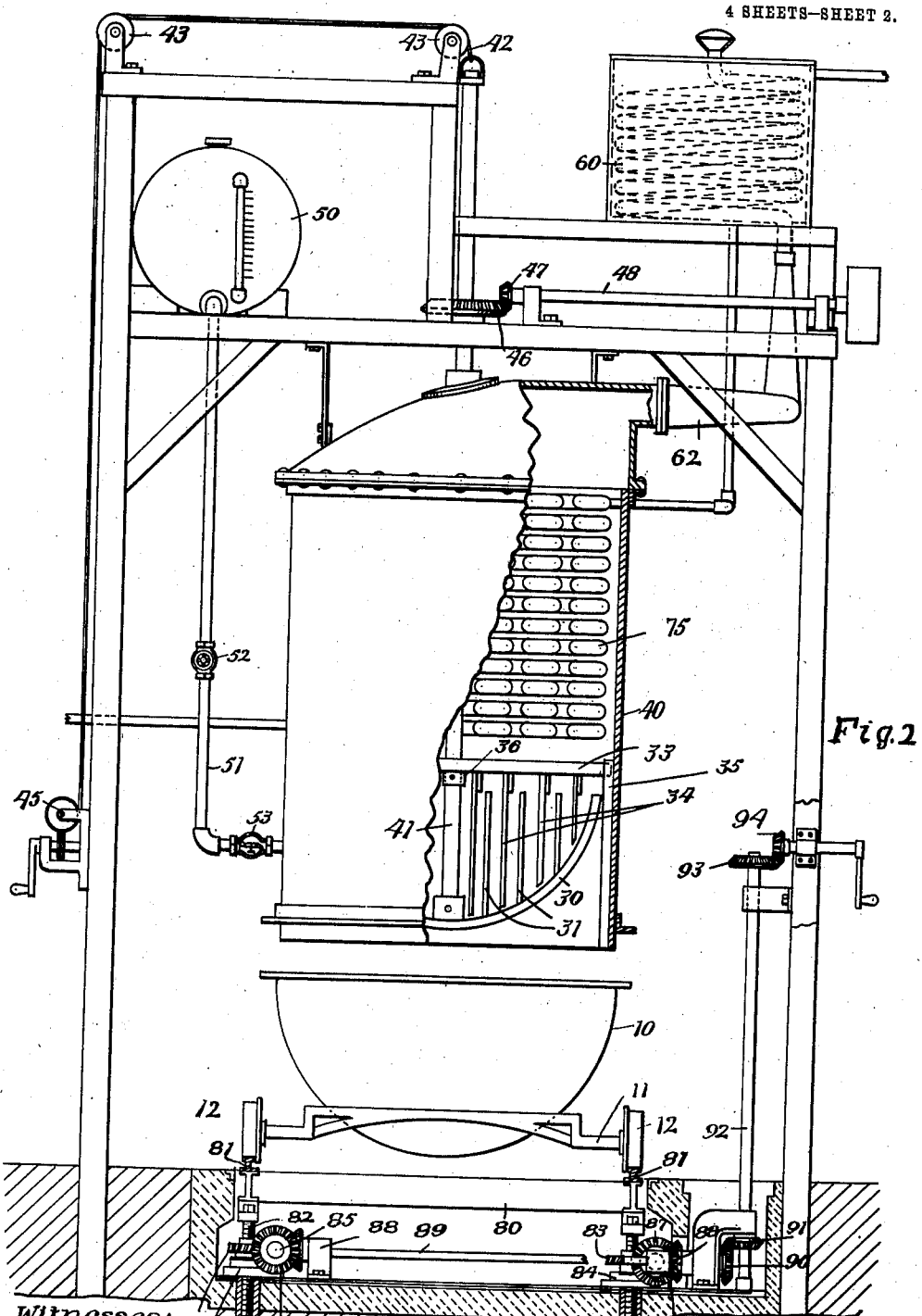
Figure 3:
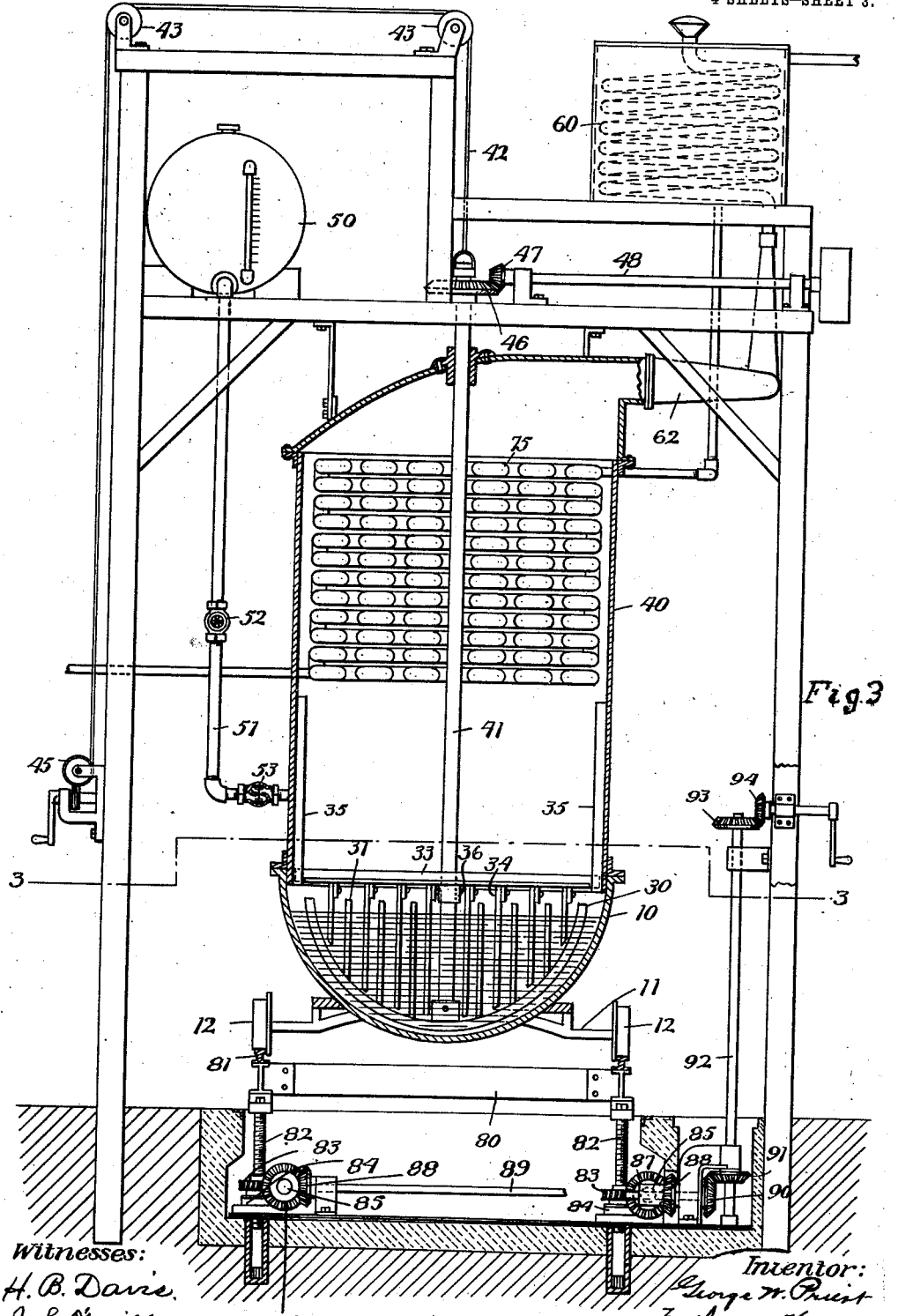
Figure 4:
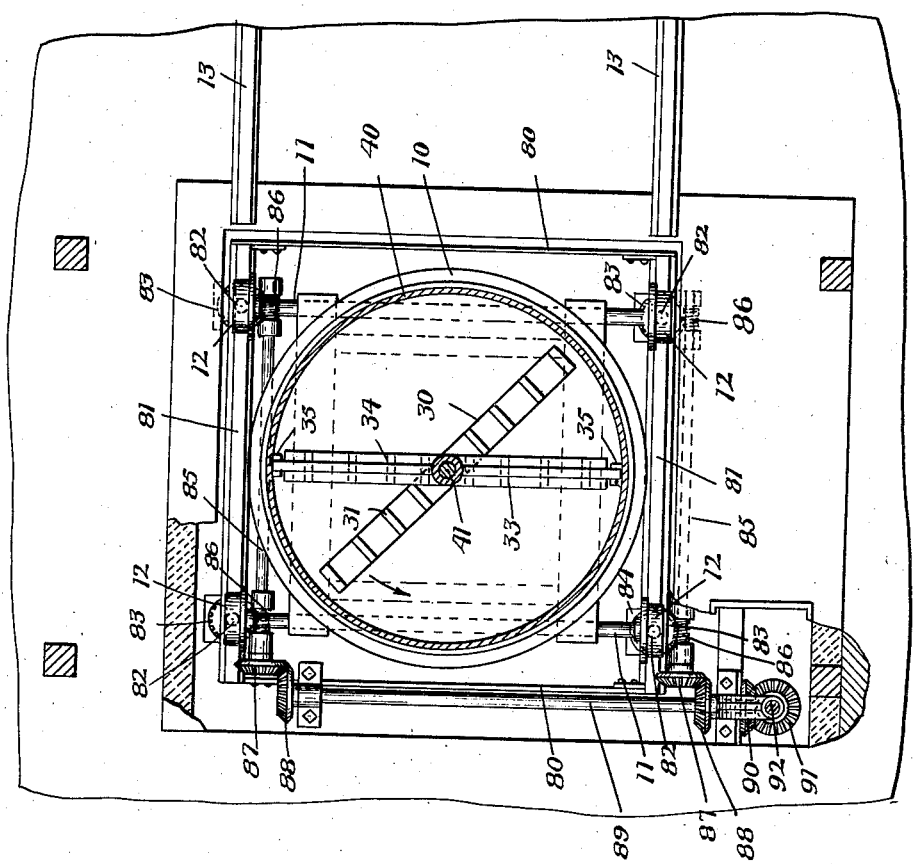

Figure 1 is a front elevation of an apparatus for making varnish embodying this invention. Fig. 2 is an enlarged side elevation and partial vertical section of the apparatus, the portable kettle being moved into position beneath the dome. Fig. 3 is an enlarged vertical section of the apparatus, a portable kettle having been raised to a position to engage the dome and the stirring device having been lowered. Fig. 4 is a plan view of the means employed to raise and lower the kettle.

10 represents the kettle, and 11 its supporting-truck bearing wheels 12, whereby it is adapted to be moved along on a track 13. 14 is the furnace into and out of which the portable kettle is movable.

40 is the dome, the lower end of which is shaped to fit the top of the kettle, and when in engagement therewith to close the top of the kettle. Said dome is herein stationarily supported on a framework, and is arranged near the furnace, and the track 13 extends from the furnace to the dome.

The stirring-device is arranged within the dome, which, as here shown, comprises an axially movable revoluble shaft 41, extended through the top of the dome and having a sliding connection therewith, and having attached to its lower end the revoluble element of the stirring-device. Said revoluble element, as here shown, consists of a curved bar 30, shaped to correspond to the shape of the kettle, having several upwardly extended arms 31, all of which terminate in a plane with the ends of the curved bar, and near the top of the kettle. The non-revoluble element of the stirring-device with which said revoluble element coöperates, as here shown, consists of a cross-bar 33, extended diametrically across the dome, having several downwardly extended arms 34, arranged to occupy positions between the arms 31, the lower ends of which terminate in a curved plane concentric with the curved bar 30, and said revoluble element is adapted to be moved up and down within the dome with and by the axially movable shaft 41, so as to maintain its coöperative relation with the revoluble element, and said non-revoluble element is guided in its vertical movements by guideways 35 arranged on the interior of the wall of the dome, at the lower end portion thereof, which guideways receive the ends of the cross-bar 33. The shaft 41 has secured to it a collar 36 on which the non-revoluble element rests, whereby said non-revoluble element is raised by the shaft when the latter is moved axially, it being permitted to fall by gravity. Said shaft 41 is moved axially by any suitable means, and, as here shown, for the accomplishment of this result a cord 42 is loosely connected to its upper end, which passes over suitable pulleys 43, and around a windlass 45. The shaft is rotated by any suitable means, and, as here shown, for the accomplishment of this result a bevel-gear 46 is splined on the shaft which is engaged by a bevel-gear 47, secured to the driving-shaft 48. When the kettle is moved to a position beneath the dome and raised to engage the dome, the shaft 41 may be lowered, and both the non-revoluble and revoluble elements of the stirring-device lowered with it to enter the contents of the kettle, and then said shaft may be revolved to in turn revolve the revoluble element of the stirring-device. When the stirring-operation has been completed the shaft and the stirring-device which is connected with it may be raised.

A pipe 51 leads from a tank 50 to the lower end portion of the dome, for the delivery of a liquid solvent, such for instance, as naphtha, said pipe having controlling-valves 52 and 53.

In the top part of the dome a large cooling space is provided, and in said space cooling pipes 75 are arranged which lead from the tank of a condenser 60; and a large pipe 62 leads from the top of the dome to the condensing-coil of said condenser.

The truck 11 supporting the kettle, and movable along on the track 13, and designed to be moved to a position beneath the stationary dome 40, and then to be bodily raised and lowered to move the kettle into and out of engagement with the dome, and, as here shown, for the accomplishment of this result a platform 80 is provided, of square or other shape, having a pair of rails 81 arranged thereon, in continuation of the rails of the track 13, which permit the truck to pass onto the platform and to be supported beneath the dome. Said platform is supported upon elevating-means, here shown as four screws 82, arranged at and secured to the corners of the platform and extended through threaded holes in worm-wheels 83, which rest on bearings 84, sufficiently substantial to support the weight of the loaded platform. As said worm-wheels are revolved the screws will be moved longitudinally and the platform raised and lowered according to the direction of rotation of said worm-wheels. Said worm-wheels are revolved simultaneously and to this end two shafts 85, each bearing two worms 86, are provided, the worms on each shaft engaging, respectively, two of the worm-wheels, and said worm-shafts 85, each have a bevel-gear 87 at one end and said bevel-gears are engaged by bevel-gears 88 secured to a shaft 89, having a bevel-gear 90, which is engaged by a bevel-gear 91, secured to a shaft 92, having a bevel-gear 93, which is engaged by a bevel-gear 94, secured to the driving-shaft. Upon turning said driving-shaft in one or the other direction, the elevating-means is operated through the gearing thus described, and the platform raised and lowered.

In operation the truck bearing the kettle will be moved onto the platform, beneath the dome, and the elevating-means will then be operated to raise the kettle into engagement with the dome, and to hold it, the worm-gearing which forms a part of the elevating-means acting to hold the platform in any position it may be set.

The elevating-means here shown is simple and effective, but in lieu thereof other suitable means having substantially the same capabilities may be employed without departing from the spirit and scope of this invention.

I claim:—

1. In an apparatus of the kind described, a portable kettle, a stationary dome for closing the top of the kettle, means for moving the kettle into and out of engagement with the dome, a stirring-device arranged in the dome, comprising a revoluble element and a non-revoluble element, an axially movable revoluble shaft to which said revoluble element is secured, vertical guideways on the interior of the wall of the dome for the non-revoluble element, and means secured to said shaft and engaging said non-revoluble element to move said element when said shaft is moved axially, substantially as described.

2. In an apparatus of the kind described, a kettle, a dome for closing the top of the kettle, an axially movable revoluble shaft extended through the top of the dome, means for moving said shaft axially and means for revolving said shaft, both arranged outside of the dome, a stirring-device arranged in the dome comprising a revoluble element and a non-revoluble element, said revoluble element being secured to the shaft and said non-revoluble element being arranged on and movable axially with the shaft, and vertical guideways on the interior of the wall of the dome for said non-revoluble element which permits of vertical movement but prevents rotary movement thereof, substantially as described.

3. In an apparatus of the kind described, a kettle, a dome for closing the top of the kettle, an axially movable revoluble shaft extended through the top of the dome, means for moving said shaft axially and means for revolving it, both arranged outside of the dome, a bar secured to the lower end of said shaft having a plurality of upwardly extended arms, a cross-bar extended diametrically across the dome which is loosely connected with the shaft, having a plurality of downwardly extended arms, and vertical guideways arranged on the interior of the wall of the dome which receive the ends of said cross-bar and permit vertical movement but prevent rotary movement thereof, substantially as described.

4. In an apparatus of the kind described, the combination of a stationary dome, a stirring-device arranged within the dome, a portable kettle, a rising and falling platform arranged beneath the dome to receive upon it the kettle, and means to raise and lower said platform to move the kettle into and out of engagement with the dome, substantially as described.

5. In an apparatus of the kind described, the combination of a stationary dome, a stirring-device arranged within the dome, a portable kettle, a rising and falling platform arranged beneath the dome to receive upon it the kettle, and means including worm-gearing to raise and lower said platform to move the kettle into and out of engagement with the dome and to hold said kettle in any position it may occupy, substantially as described.

6. In an apparatus of the kind described, the combination of a stationary dome, a stirring-device arranged therein, means to raise and lower said stirring-device, a portable kettle, a platform onto which said kettle is run, and elevating-means for said platform, whereby the kettle is moved into and out of engagement with the dome, substantially as described.

7. In an apparatus of the kind described, the combination of a stationary dome, a stirring-device arranged therein, means to raise and lower said stirring-device, a portable kettle, a platform onto which said kettle is run, means to raise and lower said platform including worm-gearing, whereby the platform is held in any position it may be set, substantially as described.

8. In an apparatus of the kind described, the combination of a stationary dome, a stirring-device arranged therein, a kettle and supporting-truck for the kettle, a rising and falling platform located beneath the dome having rails thereon to support the kettle beneath the dome, and means to raise and lower said platform, substantially as described.

9. In an apparatus of the kind described, the combination of a stationary dome, a stirring-device arranged therein, a kettle and supporting-truck for the kettle, a rising and falling platform arranged to support the kettle beneath the dome, screws connected with said platform, worm-wheels having screw-threaded center-holes for said screws, means to revolve said worm-wheels to raise and lower the screws and correspondingly move the platform, substantially as described.

10. In an apparatus of the kind described, the combination of a stationary dome, an axially movable revoluble stirring-device arranged within the dome, a kettle, and supporting-truck for the kettle, a platform arranged to support the kettle beneath the dome, means to raise and lower said platform, means to raise and lower the stirring-device, and means to revolve said stirring-device, substantially as described.

11. In an apparatus of the kind described, a portable kettle, a stationary dome for closing the top of the kettle, means to raise and lower the kettle to engage and disengage the dome, means connected with the dome for stirring the contents of the kettle, means fixedly connected with the dome for delivering a liquid solvent to the kettle while closed, and means for cooling the space within the stationary dome which is in open communication with the kettle, substantially as described.

In testimony whereof, I have signed my name to this specification, in the presence of two subscribing witnesses.

GEORGE W. PRIEST.

Witnesses:
B. J. Noyes,
H. B. Davis.